(12) United States Patent
Insulander Björk et al.

(10) Patent No.: US 10,726,958 B2
(45) Date of Patent: Jul. 28, 2020

(54) FUEL ASSEMBLY FOR A NUCLEAR POWER BOILING WATER REACTOR

(71) Applicant: THOR ENERGY AS, Oslo (NO)

(72) Inventors: Klara Insulander Björk, Göteborg (SE); Øystein Asphjell, Vormsund (NO)

(73) Assignee: Thor Energy AS, Oslo (NO)

( * ) Notice: Subject to any disclaimer, the term of this patent is extended or adjusted under 35 U.S.C. 154(b) by 426 days.

(21) Appl. No.: 15/518,920

(22) PCT Filed: Oct. 12, 2015

(86) PCT No.: PCT/EP2015/073569
§ 371 (c)(1),
(2) Date: Apr. 13, 2017

(87) PCT Pub. No.: WO2016/058993
PCT Pub. Date: Apr. 21, 2016

(65) Prior Publication Data
US 2017/0221590 A1    Aug. 3, 2017

(30) Foreign Application Priority Data

Oct. 17, 2014    (EP) .................... 14189385

(51) Int. Cl.
| | | |
|---|---|---|
| *G21C 3/32* | (2006.01) | |
| *G21C 3/328* | (2006.01) | |
| *G21C 3/58* | (2006.01) | |
| *G21C 3/62* | (2006.01) | |
| *G21C 7/06* | (2006.01) | |
| *G21C 3/326* | (2006.01) | |
| *G21C 7/00* | (2006.01) | |
| *G21C 3/16* | (2006.01) | |
| *G21C 3/04* | (2006.01) | |

(52) U.S. Cl.
CPC ............. *G21C 3/328* (2013.01); *G21C 3/16* (2013.01); *G21C 3/326* (2013.01); *G21C 3/58* (2013.01);
(Continued)

(58) Field of Classification Search
CPC . G21C 3/00; G21C 3/04; G21C 3/045; G21C 3/28; G21C 3/30; G21C 3/32;
(Continued)

(56) References Cited

U.S. PATENT DOCUMENTS

| | | |
|---|---|---|
| 3,147,191 A | 9/1964 | Crowther |
| 3,211,621 A | 10/1965 | Creagan |

(Continued)

FOREIGN PATENT DOCUMENTS

| | | |
|---|---|---|
| GB | 903142 | 8/1962 |
| JP | S53109089 | 9/1978 |

(Continued)

OTHER PUBLICATIONS

Notice of Reasons for Rejection issued in corresponding JP Application No. 2017-519307, dated May 21, 2019, pp. 1-4.
(Continued)

*Primary Examiner* — Marshall P O'Connor
(74) *Attorney, Agent, or Firm* — Murtha Cullina LLP

(57) ABSTRACT

The present invention concerns a fuel assembly for a nuclear power boiling water reactor. The fuel assembly comprises fuel rods. At least 95% of the fuel rods comprise nuclear fuel material in the form of U enriched in 235U. At least 20% of the fuel rods belong to a first set of fuel rods. The fuel rods in this first set comprise both U enriched in 235U and Th. The first set comprises a first and a second subset of fuel rods. The ratio, with regard to weight, between Th and U, in each fuel rod of said first subset, is higher than the ratio, with regard to weight, between Th and U, in each fuel rod of said second subset. The invention also concerns a nuclear power boiling water reactor and a manner of operating such a reactor.

13 Claims, 3 Drawing Sheets

(52) U.S. Cl.
CPC ............. *G21C 3/623* (2013.01); *G21C 7/005* (2013.01); *G21C 7/06* (2013.01); *G21C 3/045* (2019.01); *Y02E 30/31* (2013.01); *Y02E 30/38* (2013.01); *Y02E 30/39* (2013.01)

(58) Field of Classification Search
CPC ........ G21C 3/326; G21C 3/3265; G21C 3/42; G21C 3/58; G21C 3/62; G21C 3/623
See application file for complete search history.

(56) References Cited

U.S. PATENT DOCUMENTS 5,349,618 A * 9/1994 Greenspan ............. G21C 3/326
376/429
2014/0211904 A1 7/2014 Bromley

FOREIGN PATENT DOCUMENTS

| | | |
|---|---|---|
| JP | S59132389 | 1/1983 |
| JP | S58187891 | 11/1983 |
| WO | 85/01826 A1 | 4/1985 |
| WO | 97/08711 A2 | 3/1997 |

OTHER PUBLICATIONS

PhD thesis by Cheuk Wah Lau, ISBN 978-91-7385-990-5, dated 2014.
International Preliminary Report on Patentability from PCT/EP2015/073569, dated Apr. 27, 2017.
International Search Report from PCT/EP2015/073569, dated Dec. 1, 2015.

* cited by examiner

FUEL ASSEMBLY FOR A NUCLEAR POWER BOILING WATER REACTOR

TECHNICAL FIELD

The present invention is directed to a fuel assembly for a nuclear power boiling water reactor. The present invention is further directed to a nuclear power boiling water reactor and a manner of operating a nuclear power boiling water reactor in a nuclear energy plant.

BACKGROUND

There are mainly two kinds of modern light water reactors: boiling water reactors (BWR) and pressurized water reactors (PWR). In these kinds of reactors different conditions exist. Therefore there are different requirements on the parts that are included in the different kinds of reactors. In a PWR, the fuel rods are cooled mainly by water that is in a liquid phase under a high pressure. In a BWR, the pressure is lower and the water that cools the fuel rods is evaporated such that the fuel rods are surrounded both by water in liquid phase and in a steam phase. Since the water normally flows from below upwards through the fuel assembly, the amount of steam is higher in the upper part of the fuel assembly. Because of the different working principles in a PWR and a BWR, the fuel assemblies have different designs and they differ from each other concerning many details. It is therefore clear to a person skilled in the art whether a certain fuel assembly is for a PWR or for a BWR.

In a fuel assembly for a nuclear boiling water reactor, there are a number of fuel rods, which comprise a nuclear fuel material. As mentioned above, when the fuel assembly is in operation in a nuclear reactor, a cooling medium, usually water, flows up through the fuel assembly. This water fulfils several functions. It functions as a cooling medium for cooling the fuel rods such that they will not be overheated. The water also serves as a neutron moderator, i.e. the water slows down the neutrons to a lower speed. Thereby, the probability that the neutrons induce a fission reaction is increased.

Uranium ("U") is the predominantly used nuclear fuel in currently operating nuclear reactors. The core of such a nuclear reactor has a large number of fuel assemblies with fuel rods that contain uranium fuel. A certain fraction of the fuel assemblies is removed at regular intervals and replaced with new fuel assemblies in order to compensate for the loss of reactivity occurring with irradiation during the operation of the nuclear reactor.

A uranium-based fuel is normally based on $^{238}U$ which is enriched in $^{235}U$. In a fuel assembly for a BWR the degree of enrichment is usually different for different fuel rods, depending on the fuel rods' position in the fuel assembly. Because of the design of a BWR, the ratio of the volume of the neutron moderating medium (water) to the volume of the fuel is different for different positions in the fuel assembly. The enrichment is therefore varied so that more well-moderated fuel rods have a lower enrichment and less well-moderated fuel rods have a higher enrichment.

The nuclear fuel material in some of the fuel rods in a fuel assembly normally includes, in addition to uranium, a burnable absorber, i.e. an isotope having a high neutron absorption cross section. Upon absorption of a neutron, the isotope is converted into an isotope with a low neutron absorption cross section. The purpose of such burnable absorbers is to lower the reactivity of the fuel assemblies while they are new, whereas the reactivity later in life, after the burnable absorber nuclei have absorbed a neutron, is no longer substantially reduced by any burnable absorber. The advantage of using a burnable absorber is that the power distribution between the fuel assemblies in the nuclear reactor core is more even than it would have been in the absence of burnable absorbers. The even power distribution results in higher shutdown margins, since clusters of high reactivity fuel assemblies can be avoided. In addition, a lower power peaking in the core allows for a higher average power level without risk of locally exceeding a certain power limit. The drawback of the use of burnable absorbers is that the power of the fuel rods that contain burnable absorbers is strongly reduced. This results in larger internal power peaking in the fuel assembly, and a slightly lowered reactivity also during the latter part of the life of the fuel assembly, due to remaining absorbing isotopes related to the original burnable absorber isotopes, and due to the reduced mass of fissile U in these fuel rods.

The use of Thorium ("Th") as a nuclear fuel, mixed with uranium or other fissile materials, has been proposed in numerous patents and academic publications.

WO 85/01826 A1 and WO 97/08711 A2 describe nuclear reactors of the seed-blanket type having an active core comprising seed regions of fissile material and blanket regions of fertile material capable of being converted into fissile material by neutron capture. The blanket regions comprise Th.

U.S. Pat. No. 3,211,621 describes a heterogeneous breeder or converter type neutronic reactor. The reactor core has seed fuel assemblies and blanket fuel assemblies. The blanket fuel assemblies can comprise Th.

GB 903142 describes a PWR. It is described that overheating of fuel elements in regions of enhanced flux caused by a local excess of water moderator is avoided by reducing the concentration of fissile material or by providing a neutron absorber in those regions. In order to avoid overheating in a certain zone (zone I) of the fuel rods, another zone (zone II) contains fuel which is less enriched than a third zone (zone III) and may also contain a large proportion of $^{232}Th$, e.g. as $ThO_2$ ("Thorium dioxide") mixed with $UO_2$ ("Uranium dioxide").

The use of Th to replace some of the burnable absorbers in uranium fuel assemblies has been proposed in a PhD thesis by Cheuk Wah Lau, ISBN 978-91-7385-990-5. In this work, a fuel assembly for a PWR is proposed in which all of the uranium fuel rods and some of the burnable absorber containing fuel rods are replaced by rods containing enriched uranium and a minor fraction of Th (less than or equal to 50%). The enrichment of the uranium and the fraction of Th is equal for all thorium-containing rods.

SUMMARY

In view of the prior art, an object of the present invention is to provide a fuel assembly for a nuclear boiling water reactor in which the need for burnable absorbers in order to control the reactivity is reduced. Another object is to provide such a fuel assembly in which a more even power distribution is obtained. A further object is to provide such a fuel assembly in which the need for using a variation in enrichment in the U is reduced. Another object is to provide such a fuel assembly in which the variation in reactivity over time is reduced.

The above objects are achieved by a fuel assembly as defined in claim 1.

According to the present invention, the ratio between Th and U in the nuclear fuel material thus varies between different fuel rods. Since Th fulfils a neutron absorbing function, the need for burnable absorbers is reduced by the present invention. By reducing the amount of burnable absorbers, the internal power profile within the fuel assembly becomes more even, since fewer rods need to have their reactivity strongly reduced by the burnable absorber. The variation in the mentioned ratio can be used to arrange the fuel rods with the different ratios in the fuel assembly such that an even power distribution is obtained. The need for using a varying enrichment in the U is therefore reduced. Furthermore, since Th, when the fuel assembly is used in a nuclear reactor, will be transformed into $^{233}$U, i.e. a fissile material, the variation of reactivity over time is reduced. The higher reactivity at the end of life caused by the production of $^{233}$U decreases the reactivity difference between fuel assemblies of different age, yielding a more even power distribution in the core.

Preferably, all the fuel rods in the fuel assembly comprise nuclear fuel material in the form of U enriched in $^{235}$U.

Preferably, all the Th, or at least more than 99% of the Th, is $^{232}$Th.

According to a preferred embodiment, the fuel assembly is more than 3 m long. Preferably, most of the fuel rods (more than 50%, preferably more than 70% of the fuel rods) are more than 3 m long . The fuel assembly may also comprise some shorter fuel rods, so-called part-length fuel rods. Preferably, the fuel rods in the fuel assembly are arranged parallel to each other. During use they, and the whole fuel assembly, normally extend in the vertical direction. Preferably, the fuel assembly comprises one or more channels for non-boiling water.

In this document, the defined fuel assembly, and the proportion of different isotopes, refer to the new fuel assembly to be used in a nuclear power boiling water reactor. During the use, some isotopes are transformed into other isotopes (or other elements), whereby the proportion of for example the fissile isotopes changes.

The concept "nuclear fuel material" is herein used to refer to both fissile material (e.g. $^{235}$U in $UO_2$) and fertile material (e.g.$^{232}$Th in $ThO_2$). The fuel rods may also comprise some other components, such as blanket pellets and springs, which do not constitute nuclear fuel material. However, for example burnable absorbers, which may be included in the nuclear fuel material, and other additives, such as binder material, sintering enhancers, lubricants, $U_3O_8$ and pore formers form part of the nuclear fuel material, as the concept is used in this document.

According to an embodiment of the fuel assembly according to the invention, said first set of fuel rods also comprises a third subset of fuel rods, wherein the ratio, with regard to weight, between Th and U, in each fuel rod of said third subset, is lower than the ratio, with regard to weight, between Th and U, in each fuel rod of said second subset.

According to a further embodiment of the fuel assembly according to the invention, said first set of fuel rods also comprises a fourth subset of fuel rods, wherein the ratio, with regard to weight, between Th and U, in each fuel rod of said fourth subset, is lower than the ratio, with regard to weight, between Th and U, in each fuel rod of said third subset.

By having more such subsets, with a varying ratio between Th and U in the nuclear fuel material, an even more improved fuel assembly is achieved. The different fuel rods with different ratios can then be positioned such that the power distribution becomes even more even, also over time. Also the need for varying the enrichment in U is further reduced.

It should be noted, that the fuel assembly may also comprise more (or less) than four such subsets with different ratios, with regard to weight, between Th and U.

If the fuel assembly for example has four such subsets, the ratios, with regard to weight, between Th and U in the nuclear fuel material for the different subsets may for example be as follows:

first subset: ratio is such that the relation Th/(Th+U), with regard to weight, is 0.35-0.60, for example 0.41;

second subset: ratio is such that the relation Th/(Th+U), with regard to weight, is 0.29-0.34, for example 0.32;

third subset: ratio is such that the relation Th/(Th+U), with regard to weight, is 0.15-0.28, for example 0.26;

fourth subset: ratio is such that the relation Th/(Th+U), with regard to weight, is 0.05-0.14, for example 0.09.

According to a further embodiment of the fuel assembly according to the invention, in all fuel rods of each subset, the enrichment of $^{235}$U in the U is within the range 4.00-6.00%, preferably within the range 4.50-5.00%. Such a degree of enrichment enables a high reactivity. Furthermore, it is advantageous that the enrichment only varies to a low degree, or not at all, between the different fuel rods in said subsets.

The defined range of enrichment is thus, according to this embodiment, the case for at least the first and second subsets of fuel rods, preferably also for the third subset of fuel rods, more preferred for all subsets of fuel rods.

According to a further embodiment of the fuel assembly according to the invention, the fuel rods of said subsets have the same enrichment of $^{235}$U in the U, or at least substantially the same enrichment, preferably 4.95%. By having the same, high, enrichment in the fuel rods, a high reactivity is obtained and the production of the nuclear fuel rods is simplified. With the present invention, an even power distribution is still obtained, even without the variation in enrichment in said fuel rods, because of the variation in the ratio between Th and U.

With "substantially the same" is here meant that the enrichment could vary slightly, for example because of production tolerances.

The defined same enrichment, or at least substantially the same enrichment, is thus, according to this embodiment, the case for at least the first and second subsets of fuel rods, preferably also for the third subset of fuel rods, more preferred for all subsets of fuel rods.

According to a further embodiment of the fuel assembly according to the invention, said subsets of fuel rods are positioned in the fuel assembly such that fuel rods with a higher ratio, with regard to weight, between Th and U are positioned where there will be more moderator when the fuel assembly is in use in the nuclear power boiling water reactor, than where the fuel rods of a subset with a lower ratio, with regard to weight, between Th and U are positioned. The variation in said ratio can therefore be used instead of varying the enrichment in U.

The fuel rods of the different subsets are positioned such that a more even power distribution is achieved in the nuclear fuel assembly, when it is used in the nuclear power boiling water reactor, and such that internal power peaks in the fuel assembly are reduced.

According to a further embodiment of the fuel assembly according to the invention, between 25% and 80%, preferably between 35% and 70% of the fuel rods in said fuel assembly belong to said first set of fuel rods. By having such a number of fuel rods in said first set, the above described objects and advantages are obtained in an efficient manner.

According to a further embodiment of the fuel assembly according to the invention, each one of between 20% and 90% of the fuel rods, more preferred between 25% and 75% of the fuel rods, belongs to a second set of fuel rods, wherein each fuel rod in this second set comprises U enriched in $^{235}$U, but does not comprise any Th and not any burnable absorber, or at least not any substantial amounts of Th or burnable absorber, wherein the enrichment of $^{235}$U in the U in the second set is within the range 4.00-6.00%, preferably within the range 4.50-5.00%, most preferred 4.95%. By using such a number of fuel rods without any substantial amounts of Th or burnable absorbers in the nuclear fuel material, a high reactivity is obtained The expression "not any substantial amounts" means that very low insignificant amounts may exist, for example due to impurities.

According to a further embodiment of the fuel assembly according to the invention, each one of between 3% and 20% of the fuel rods, more preferred between 5% and 15% of the fuel rods, belongs to a third set of fuel rods, wherein each fuel rod in this third set comprises U enriched in $^{235}$U and also at least one kind of burnable absorber. The burnable absorber can for example be Gd, Er or B. It is advantageous to use burnable absorbers in the nuclear fuel material in some fuel rods in order to lower the reactivity in the new fuel assemblies. However, with the present invention only very few (or no at all) such fuel rods which include burnable absorbers need to be used.

The amount of burnable absorber, with regard to weight, in the nuclear fuel material in each fuel rod in said third set may for example be between 1.0% and 10%, preferably between 3.0% and 5.0%. Preferably, each fuel rod in said third set does not comprise any Th, or at least not any substantial amount of Th. Any suitable kind of burnable absorber may be used.

According to a further embodiment of the fuel assembly according to the invention, in each fuel rod of said second set, the enrichment of $^{235}$U in the U is the same, or at least substantially the same, as the enrichment of $^{235}$U in the U in the fuel rods of said subsets. By having so many fuel rods with the same enrichment in the U, the fabrication of the nuclear fuel is further simplified, at the same time as a high reactivity can be achieved.

According to a further embodiment of the fuel assembly according to the invention, each one of between 2% and 10% of the fuel rods, more preferred between 4% and 8% of the fuel rods, belongs to a fourth set of fuel rods, wherein each fuel rod in this fourth set comprises U enriched in $^{235}$U, but does not comprise any Th and not any burnable absorber, or at least not any substantial amounts of Th or burnable absorber, wherein the enrichment of $^{235}$U in the U in the fourth set is less than 4.00%, preferably within the range 1.50-3.00%. It has appeared to be advantageous to use a few fuel rods with a lower enrichment in the U in order to avoid excessive conversion of $^{232}$Th to $^{233}$U in well-moderated fuel rods, which would lead to disproportionally high power in these fuel rods towards the end of life of the fuel assembly. With the present invention, only very few (or no at all) such fuel rods need to be used.

According to a further embodiment of the fuel assembly according to the invention, the U in the nuclear fuel material in said fuel rods is present in the form of $UO_2$ and the Th is present in the form of $ThO_2$. Such compounds are known to be advantageous for use as nuclear fuel.

According to a further embodiment of the fuel assembly according to the invention, the nuclear fuel material in said fuel rods is in the form of pellets arranged on top of each other such that they form a stack of nuclear fuel pellets in the cladding tubes, wherein the different fuel pellets with nuclear fuel material within one and the same fuel rod have the same composition. The use of such pellets is known to be advantageous for nuclear fuel. Since the different fuel pellets within one and the same fuel rod have the same composition, the fabrication of the nuclear fuel assembly is facilitated.

Another object of the invention is to provide a nuclear power boiling water reactor with advantageous properties. This object is achieved by a nuclear power boiling water reactor, comprising a core, wherein a plurality of nuclear fuel assemblies according to any one of the preceding embodiments are arranged in said core. With such a nuclear power boiling water reactor the above described advantages are implemented in a nuclear reactor.

A further object of the invention is to provide an advantageous manner of operating a nuclear power boiling water reactor. This object is achieved by a manner of operating a nuclear power boiling water reactor in a nuclear energy plant, comprising:

arranging a plurality of nuclear fuel assemblies according to any one of the preceding embodiments in the core of the nuclear reactor, operating said nuclear reactor such that energy is produced. With this manner of operating a nuclear power boiling water reactor, the above mentioned advantages are achieved.

DETAILED DESCRIPTION

An embodiment of the invention will now be described with reference to the figures.

Figure 1:
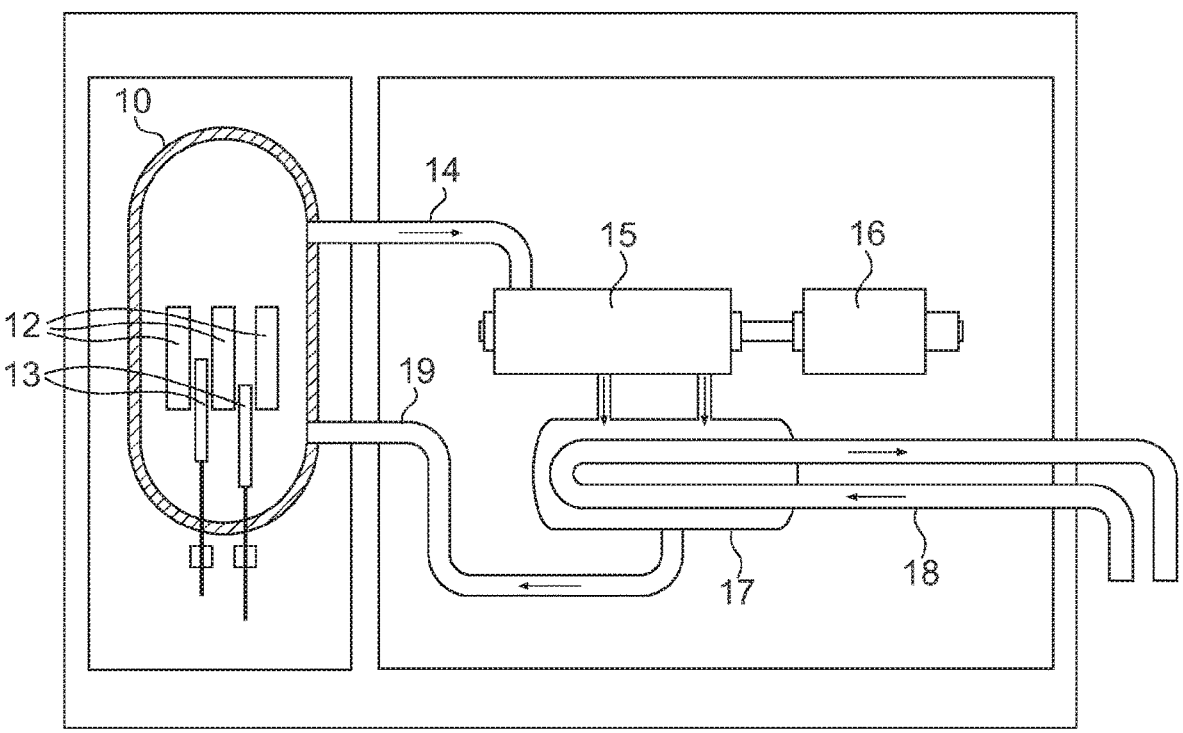
FIG. 1 shows schematically a nuclear power boiling water reactor of a nuclear energy plant.

FIG. 1 thus shows schematically a nuclear energy plant with a nuclear power boiling water reactor (BWR). The plant comprises a reactor vessel 10. In the core in the reactor vessel 10 a large number of fuel assemblies 12 are arranged. In the reactor vessel 10 there are also control rods 13, which can be inserted between the fuel assemblies 12 in order to control the operation of the nuclear reactor. Steam from the reactor vessel 10 is conducted via a conduit 14 to a turbine 15. With the help of the turbine 15 electric energy is generated by an electric generator 16. Steam from the turbine 15 is led to a steam condenser 17. The steam condenser 17 is cooled by cold water which is transported in a conduit 18. Water from the condenser 17 is fed back to the reactor vessel 10 via a conduit 19.

Figure 2:
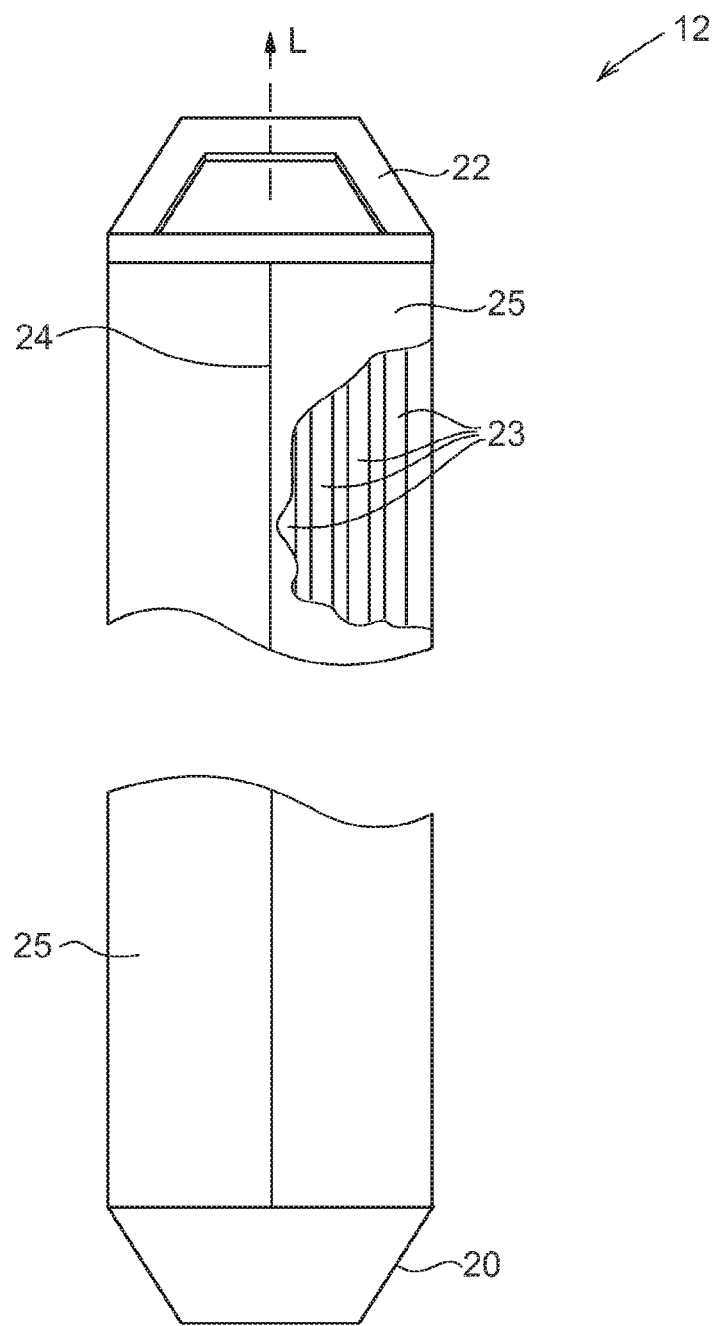
FIG. 2 shows schematically a fuel assembly for a boiling water reactor.

FIG. 2 shows schematically a fuel assembly 12 in accordance with an embodiment of the present invention for a BWR. The fuel assembly may be about 4 m long and defines a length direction L. FIG. 2 shows an upper and a lower part of the fuel assembly. The fuel assembly 12 has a connecting member 20 at the bottom of the fuel assembly. At the top of the fuel assembly 12, there is a handle 22. The fuel assembly 12 comprises a number of fuel rods 23. A fuel channel 25 surrounds the fuel rods 23. According to this embodiment, the fuel channel 25 has a generally square shape (see also FIG. 3) and therefore has four corners. One corner is marked 24 in FIG. 2. It should be noted that in FIG. 2 part of the fuel channel 25 is removed in order to show the fuel rods 23 inside the fuel channel 25.

When the fuel assembly 12 is in use in a nuclear power BWR, water enters into the fuel channel 25 at the bottom via the connecting member 20 and the produced steam exits at the top of the fuel channel 25.

According to an embodiment of the present invention, each fuel rod 23 comprises a cladding tube 52 (see FIG. 4) and nuclear fuel material in the form of pellets 50 arranged such that they form a stack in the cladding tube 52. The nuclear fuel pellets 50 comprise nuclear fuel material in the form of $UO_2$. The U is enriched in $^{235}U$.

Figure 3:
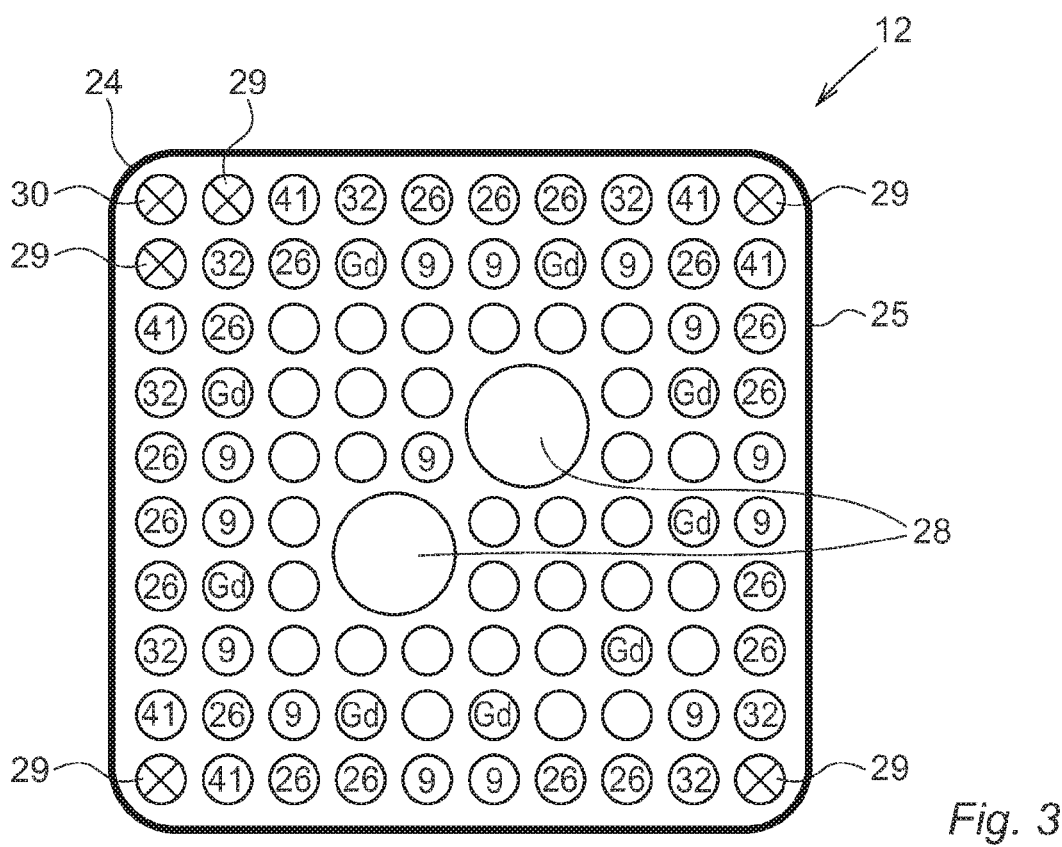
FIG. 3 shows schematically a cross-section of an embodiment of a fuel assembly according to the invention.

FIG. 3 shows schematically a cross-section of a fuel assembly 12 according to an embodiment of the present invention.

All the small circles in FIG. 3 are fuel rods 23 (see also FIG. 2). The fuel rods are surrounded by the above described fuel channel 25. The fuel assembly also comprises two water channels 28. During use, non-boiling water flows through these water channels 28. The water in the water channels 28 functions as a neutron moderator.

When the fuel assembly 12 is used in a nuclear power BWR, two of the sides of the fuel assembly 12 (the side to the left in FIG. 3 and the side at the top of FIG. 3) will be positioned next to a space where control rod blades may be inserted. The corner 24 points to the cross-center of a cruciform control rod. Since the design of such control rods are known to a person skilled in the art, the control rod will not be described in more detail here.

The fuel rods marked 41, 32, 26 and 9 in FIG. 3 together constitute a first set of fuel rods. The nuclear fuel material in each fuel rod in this first set comprises, in addition to the mentioned $UO_2$, also $ThO_2$.

The first set of fuel rods 41, 32, 26, 9 comprises a first, second, third and fourth subset of fuel rods. The ratios, with regard to weight, between Th and U in the fuel rods of the different subsets differ from each other.

In the shown embodiment, the first subset has six fuel rods marked 41. The ratio between Th and U in each fuel rod in this subset is such that the relation Th/(Th+U), with regard to weight, is about 0.41.

The fuel rods of the second subset are marked 32. There are seven such fuel rods in the shown embodiment. The ratio between Th and U in each fuel rod in this second subset is such that the relation Th/(Th+U), with regard to weight, is about 0.32.

The fuel rods of the third subset are marked 26. There are eighteen such fuel rods in the shown embodiment. The ratio between Th and U in each fuel rod in this third subset is such that the relation Th/(Th+U), with regard to weight, is about 0.26.

The fuel rods in the fourth subset are marked 9. There are fourteen such fuel rods in the shown embodiment. The ratio between Th and U in each fuel rod in the fourth subset is such that the relation Th/(Th+U), with regard to weight, is about 0.09.

The fuel rods that are not marked in FIG. 3 (empty small circles) constitute a second set of fuel rods. These fuel rods comprise nuclear fuel material in the form of $UO_2$ but do not comprise any Th and not any burnable absorber. In to the shown embodiment there are thirty-two such fuel rods.

For each of the fuel rods described so far (i.e. the fuel rods marked 41, 32, 26, 9 and the empty small circles) the enrichment of $^{235}U$ in the U is 4.95%.

In FIG. 3 nine fuel rods are marked Gd. These fuel rods constitute a third set of fuel rods. Each fuel rod of this type comprises, in addition to the $UO_2$, also a burnable absorber. According to this embodiment the nuclear fuel material of each of these fuel rods contains about 3.5%, with regard to weight, $Gd_2O_3$ as a burnable absorber. The enrichment of $^{235}U$ may be somewhat lower in these fuel rods than in the fuel rods of said first set and said second set.

The fuel rods marked with a cross in FIG. 3 constitute a fourth set of fuel rods. The nuclear fuel material in each fuel rod in this set of fuel rods comprises U enriched in $^{235}U$, but does not comprise any Th and not any burnable absorber. Furthermore, the enrichment of $^{235}U$ in the U in this fourth set of fuel rods is less than 3.00%. According to this embodiment, five such fuel rods 29 have the enrichment 2.08% and one fuel rod 30 has the enrichment 1.88%. The fuel rod 30 is positioned in the corner 24 which is intended to be positioned next to the cross-center of a cruciform control rod.

It should be noted that concerning the mentioned subsets of fuel rods 41, 32, 26, 9, the fuel rods with a higher ratio, with regard to weight, between Th and U are positioned generally where there will be more moderator (more water) when the fuel assembly is in use in the nuclear power BWR than where fuel rods of a subset with a lower such ratio are positioned. It can be noted that in a fuel assembly for a BWR, there will generally be more moderator close to the corners of the fuel assembly.

In addition to the materials described above in this embodiment, the nuclear fuel material in fuel rods may contain small amounts of other additives, as known to a person skilled in the art.

Figure 4:
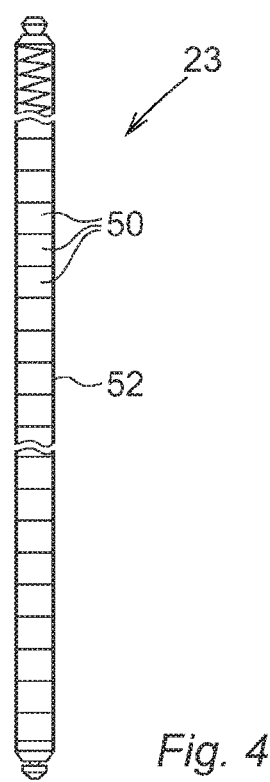
FIG. 4 shows schematically a fuel rod.

In each fuel rod 13, the nuclear fuel material is arranged in the form of pellets 50 in the manner described in connection with FIG. 4. The different nuclear fuel pellets 50 within one and the same fuel rod 23 have the same composition.

FIG. 1 also illustrates an embodiment of a nuclear power boiling water reactor according to the present invention, when the core of the reactor, inside the reactor vessel 10, has been loaded with a plurality of nuclear fuel assemblies 12 in accordance with the above described embodiment.

According to the present invention, a manner of operating a nuclear power boiling water reactor of a nuclear energy plant comprises:

arranging a plurality of nuclear fuel assemblies 12 according to the above described embodiment in the core of the nuclear reactor, and operating the nuclear reactor such that energy is produced, for example with the help of an electric generator 16 as shown in FIG. 1.

The present invention is not limited to the examples described herein, but can be varied and modified within the scope of the following claims.

What is claimed is:

1. A fuel assembly for a nuclear power boiling water reactor, comprising:
   a plurality of fuel rods, each comprising a cladding tube and nuclear fuel material positioned in the cladding tube; and
   a fuel channel surrounding said plurality of fuel rods;
   wherein each one of at least 95% of the plurality of fuel rods comprises nuclear fuel material in the form of Uranium ("U") enriched in 235U;
   wherein each one of at least 20% of the plurality of fuel rods belongs to a first set of fuel rods;

wherein each fuel rod in the first set of fuel rods comprises both U enriched in 235U and Thorium ("Th"); and wherein the first set of fuel rods comprises at least a first and a second subset of fuel rods, wherein the ratio, with regard to weight, between Th and U, in each fuel rod of said first subset, is higher than the ratio, with regard to weight, between Th and U, in each fuel rod of said second subset wherein each one of between 20% and 90% of the plurality of fuel rods belongs to a second set of fuel rods, wherein each fuel rod in the second set comprises U enriched in 235U, but does not comprise a substantial amount of Th or a burnable absorber, wherein the enrichment of 235U in the U in the second set is within the range 4.00-6.00%.

2. A fuel assembly according to claim 1, wherein said first set of fuel rods further comprises a third subset of fuel rods, wherein the ratio, with regard to weight, between Th and U, in each fuel rod of said third subset, is lower than the ratio, with regard to weight, between Th and U, in each fuel rod of said second subset.

3. A fuel assembly according to claim 2, wherein said first set of fuel rods further comprises a fourth subset of fuel rods, wherein the ratio, with regard to weight, between Th and U, in each fuel rod of said fourth subset, is lower than the ratio, with regard to weight, between Th and U, in each fuel rod of said third subset.

4. A fuel assembly according to claim 1, wherein, in all of the fuel rods of each subset, the enrichment of 235U in the U is within the range 4.00-6.00%.

5. A fuel assembly according to claim 1, wherein the fuel rods of said subsets have the same enrichment of 235U in the U.

6. A fuel assembly according to claim 1, wherein said subsets of fuel rods are positioned in the fuel assembly such that fuel rods with a higher ratio, with regard to weight, between Th and U are positioned where there will be more moderator when the fuel assembly is in use in the nuclear power boiling water reactor, than where the fuel rods of a subset with a lower ratio, with regard to weight, between Th and U are positioned.

7. A fuel assembly according to claim 1, wherein between 25% and 80% of the plurality of fuel rods belong to said first set of fuel rods.

8. A fuel assembly according to claim 1, wherein each one of between 3% and 20% of the fuel rods belongs to a third set of fuel rods, wherein each fuel rod in the third set comprises U enriched in 235U and at least one kind of burnable absorber.

9. A fuel assembly according to claim 1, wherein in each fuel rod of said second set, the enrichment of 235U in the U is substantially the same as the enrichment of 235U in the U in the fuel rods of said subsets.

10. A fuel assembly according to claim 8, wherein in each fuel rod of said second set, the enrichment of 235U in the U is substantially the same as the enrichment of 235U in the U in the fuel rods of said subsets.

11. A fuel assembly according to claim 8, wherein each one of between 2% and 10% of the plurality of fuel rods belongs to a fourth set of fuel rods, wherein each fuel rod in the fourth set comprises U enriched in 235U, but does not comprise a substantial amount of Th or a burnable absorber, wherein the enrichment of 235U in the U in the fourth set is less than 4.00%.

12. A fuel assembly according to claim 1, wherein the U in the nuclear fuel material in the plurality of fuel rods is present in the form of Uranium dioxide ("$UO_2$") and the Th is present in the form of Thorium dioxide ("$ThO_2$").

13. A fuel assembly according to claim 1, wherein the nuclear fuel material in the plurality of fuel rods is in the form of pellets arranged on top of each other such that they form a stack of nuclear fuel pellets in the cladding tubes, wherein the different fuel pellets with nuclear fuel material within one and the same fuel rod have the same composition.

* * * * *